United States Patent
Howarth et al.

(10) Patent No.: US 8,985,130 B2
(45) Date of Patent: Mar. 24, 2015

(54) MAGNETICALLY ASSISTED COUPLING FOR SEGMENTED SHAFT

(71) Applicant: EdgeWater International, Inc., Stafford Springs, CT (US)

(72) Inventors: Paul Howarth, Enfield, CT (US); Alan Gnann, Tolland, CT (US); Shawn Bannon Szczesiul, Enfield, CT (US)

(73) Assignee: EdgeWater International, Inc., Stafford Springs, CT (US)

( * ) Notice: Subject to any disclaimer, the term of this patent is extended or adjusted under 35 U.S.C. 154(b) by 0 days.

(21) Appl. No.: 13/795,922

(22) Filed: Mar. 12, 2013

(65) Prior Publication Data

US 2014/0261593 A1    Sep. 18, 2014

(51) Int. Cl.
*A45B 1/04* (2006.01)
*E04H 15/60* (2006.01)
*A45B 9/00* (2006.01)
*F16B 7/04* (2006.01)

(52) U.S. Cl.
CPC ...... *A45B 9/00* (2013.01); *F16B 7/04* (2013.01); *A45B 1/04* (2013.01); *A45B 2009/005* (2013.01)
USPC ....... 135/74; 135/120.3; 135/114; 403/109.1; 280/819

(58) Field of Classification Search
USPC ............ 135/114, 123, 127, 120.3–120.4, 135/74–75; 403/109.1, 308; 280/817–819; 43/18.1 CT, 18.1 R, 18.1 HR, 24
See application file for complete search history.

(56) References Cited

U.S. PATENT DOCUMENTS

| | | | | |
|---|---|---|---|---|
| 2,623,256 | A | | 12/1952 | Feibelman |
| 2,697,642 | A | | 12/1954 | Rudy |
| 2,705,015 | A | * | 3/1955 | Langlais ................. 52/632 |
| 3,516,697 | A | * | 6/1970 | Hahn ................... 403/118 |
| 3,669,133 | A | | 6/1972 | Hyman |
| 3,730,544 | A | * | 5/1973 | Hyman ................. 280/819 |
| 3,963,037 | A | * | 6/1976 | Clark ................... 135/65 |
| 4,274,170 | A | * | 6/1981 | Simpson ............... 114/347 |
| 4,901,405 | A | * | 2/1990 | Grover et al. ............ 24/303 |
| 4,979,531 | A | * | 12/1990 | Toor et al. .............. 135/127 |
| 5,029,847 | A | * | 7/1991 | Ross ................... 482/148 |
| 5,031,827 | A | * | 7/1991 | von Braunhut ............ 231/3 |
| 5,311,693 | A | * | 5/1994 | Underwood .............. 42/94 |
| 5,884,426 | A | * | 3/1999 | Ishida ................... 43/1 |

(Continued)

FOREIGN PATENT DOCUMENTS

| | | |
|---|---|---|
| EP | 215771 A2 | 3/1987 |
| WO | 2011048028 A1 | 4/2011 |

OTHER PUBLICATIONS

European Search Report dated Nov. 25, 2014 (European Patent Application No. 14158357.5).

*Primary Examiner* — Winnie Yip
(74) *Attorney, Agent, or Firm* — Alix, Yale & Ristas, LLP (57) ABSTRACT

A magnetically assisted coupling comprises at least two shaft segments. Each shaft segment has opposed ends and a hollow core. Adjacent segment ends are configured in a probe/socket configuration such that one segment end is configured to receive the adjacent segment end. Magnets of opposite polarity are mounted within said hollow core of adjacent segment ends, such that the magnet in the socket is positioned at a bottom of the socket, while the magnet in the probe defines a probe end. When adjacent segment ends are brought into close proximity the magnets attract each other and draw the probe end into the socket until the magnets are in contact.

19 Claims, 5 Drawing Sheets

(56) References Cited

U.S. PATENT DOCUMENTS

| | | | |
|---|---|---|---|
| 6,557,572 B2 * | 5/2003 | Lah | 135/114 |
| 6,678,989 B1 * | 1/2004 | Lowe | 43/6 |
| 6,705,654 B2 | 3/2004 | Slauf | |
| 7,162,802 B2 * | 1/2007 | Benardeau et al. | 30/147 |
| 7,841,353 B2 | 11/2010 | Lee | |
| 7,905,667 B2 * | 3/2011 | Barker | 396/419 |
| 8,371,313 B2 * | 2/2013 | Piao | 132/313 |
| 2003/0122390 A1 | 7/2003 | Slauf | |
| 2006/0254632 A1 | 11/2006 | Willis | |
| 2006/0254633 A1 | 11/2006 | Willis | |
| 2008/0011344 A1 | 1/2008 | Barker | |
| 2008/0041432 A1 | 2/2008 | Willis | |
| 2009/0056154 A1 | 3/2009 | Richins | |
| 2010/0200032 A1 | 8/2010 | Lee | |

* cited by examiner

MAGNETICALLY ASSISTED COUPLING FOR SEGMENTED SHAFT

BACKGROUND OF THE DISCLOSURE

The present disclosure relates to segmented shafts, and more particularly to a form of coupling for connecting segments of a shaft for use as a staff, probe, support or the like.

Segmented shafts are used for many purposes, including but not limited to, hiking poles, tent poles, avalanche probes and wading staffs. In each of these applications, the shaft is broken into segments for ease of storage and transportation. The segments are assembled together to form a longitudinally extended shaft. The segments are typically retained in the connected configuration, which allows the full length of the shaft to be employed for the desired purpose.

The prior art includes for example, segmented hollow tent poles connected by an elastic cord, where the elastic cord exerts tension on the assembled pole to retain the segments in a connected, extended configuration during use. This type of segmented shaft is designed for use in compression and the segments easily separate when exposed to tension or pulling forces. Wading staffs and avalanche probes also may employ a cord extending through hollow shaft segments, where the segments are assembled and the cord is secured in tension to retain the segments in a connected, extended configuration even when the staff or probe are exposed to tension or pulling forces during use. This type of segmented shaft typically requires two hands to assemble and secure the shaft in its connected, extended configuration.

Fishermen wade into streams and other bodies of water to fish. Traditionally, fishermen have used felt soled shoes to grip the stones of riverbeds and shores underfoot. Despite their grip in slippery conditions, felt soled shoes have been shown to harbor spores and larvae of non-native plants and animals, thus transmitting invasive species as anglers travel between different bodies of water. In an attempt to prevent transmission of invasive species, many fishing areas have banned the use of felt soled wading shoes. As a result, many anglers have changed to rubber soled shoes, which provide less sure footing.

Many anglers use wading staffs to improve their stability in the water and reduce the risk of injury, drowning, or loss of expensive fishing gear. Traditional wading staffs are collapsible, and may consist of telescoping segments that are secured by bayonet or threaded connections similar to hiking poles. Other wading staffs employ hollow, tubular shaft segments secured by an inextensible cord that is secured in tension to prevent disconnection of the segments when expose to a pulling motion during use, such as when the tip of the staff is wedged between material in a river or stream bed. Though traditional wading staffs are sturdy and provide an additional measure of stability, traditional wading staffs can be unwieldy and require two hands to deploy and secure. A fisherman is typically already carrying a fishing rod and may not have both hands available to deploy and assemble a wading staff. Thus, there is a significant risk an angler may drop the most expensive piece of equipment, the fishing rod, while assembling a traditional wading staff.

Additionally, traditional wading staffs also take a considerable time to assemble. An angler needing to quickly brace himself upon entering an unexpectedly stronger current or slippery area may not have sufficient time to assemble his wading staff. Furthermore, an angler seeking to move quickly to an area where a fish is rising would need to take considerable time to assemble his wading staff, and risk missing a trophy.

There is a need in the art for a sturdy segmented shaft that provides strong connective forces between each segment, yet may be quickly deployed and assembled with one hand.

SUMMARY

Briefly stated, a magnetically assisted coupling according to the disclosure employs magnets positioned to secure adjacent shaft segments against disconnection under tension. The disclosed magnetically assisted coupling will be discussed in the context of a self-deploying wading staff, but the disclosed coupling is not limited to this use and may be employed in many applications which require a segmented shaft.

Generally speaking, the disclosed magnetically assisted coupling includes magnets of opposite polarity mounted within adjacent hollow shaft segments. One shaft segment end is configured to receive the other shaft segment end in a probe/socket configuration. One of the magnets is positioned at the bottom of the socket, while the other magnet is secured to define the end of the probe. When brought into close proximity, the magnets attract each other, and draw the probe end into the socket until the magnets are in contact or nearly so. Unlike prior art probe/socket type shaft couplings, the disclosed magnetically assisted coupling is essentially self-assembling and retention against pulling or tension forces is achieved without manual intervention because of the strong attraction between the magnets within the coupling.

A self-deploying staff incorporating the disclosed magnetically assisted coupling includes a top segment with a handle, a bottom segment terminating at a tip, and at least one intermediate segment. Each segment comprises a hollow tubular body that is configured at one or both ends to mate with an adjacent segment to define an extended tubular shaft. Intermediate segments have first and second mateable ends. The mateable ends each have magnets defining apertures, and adjacent segments have magnets of opposite polarity to facilitate coupling between adjacent segments.

Adjacent shaft segments are transformable between a coupled and an uncoupled configuration. When all of the segments are mated to form a unitary staff, the staff is in a deployed configuration. When each of the segments is uncoupled from its neighbor and the segments are folded into a compact bundle, the staff is in a storage configuration. The staff is typically placed in a storage pouch secured to the belt or person of the angler. It is intended that the handle of the stored staff be accessible to the angler for quick deployment.

A substantially inextensible cord is anchored at the handle end of the top segment and the second tip end of the bottom segment. The hollow cores and apertures of each segment allow the cord to extend from the handle to the tip. The cord retains each of the plurality of segments as part of the whole staff when adjacent segments are uncoupled. Additionally, the cord maintains the first and second connector ends in close proximity when the staff is in the storage configuration.

In one embodiment of the current disclosure, the cord is a static (inextensible) cord anchored at either the first end of the top segment or the second end of the bottom segment by a relatively stiff spring. The configuration of the static cord and spring urges each of the segments into a mated configuration without further manipulation.

To transform the staff between the storage configuration and the deployed configuration, an angler need only grasp the handle and withdraw the uncoupled staff from the storage pouch, which allows the bottom and intermediate segments to fall under the influence of gravity. As the bottom and intermediate segments fall, the spring loaded cord urges the segments in close proximity to one another, while the oppositely polarized magnets of adjacent segments urge the first and second ends into the mated configuration. The strong magnetic bond between magnets of coupled adjacent segments resists forces that pull on the segments during use.

To transform the staff between the deployed and the storage configuration, an angler must uncouple each individual segment from its neighbour, by applying a separating force sufficient to separate the magnets. As an angler decouples successive segments, he must fold each segment back on its neighbour to create a compact bundle. Once all the staff is in this uncoupled, bundled configuration, the angler can store the staff in a holster, pouch or pocket for easy access.

The staff of the present disclosure provides advantages over and relative to the prior art. Contrary to prior art staffs where segments require two hands to secure adjacent segments to each other, the staff of the present disclosure may be completely assembled with only one hand. Additionally, an angler may quickly assemble or disassemble the staff given the one-handed assembly capabilities and strong connective forces provided by the magnets.

BRIEF DESCRIPTION OF THE DRAWINGS

Aspects of the preferred embodiment will be described in reference to the Drawings, where like numerals reflect like elements.

DETAILED DESCRIPTION OF THE PREFERRED EMBODIMENT

With reference to the drawings, wherein like numerals represent like parts throughout the Figures, a self-deploying staff incorporating the disclosed magnetically assisted coupling is generally designated by the numeral 10.

Figure 1:
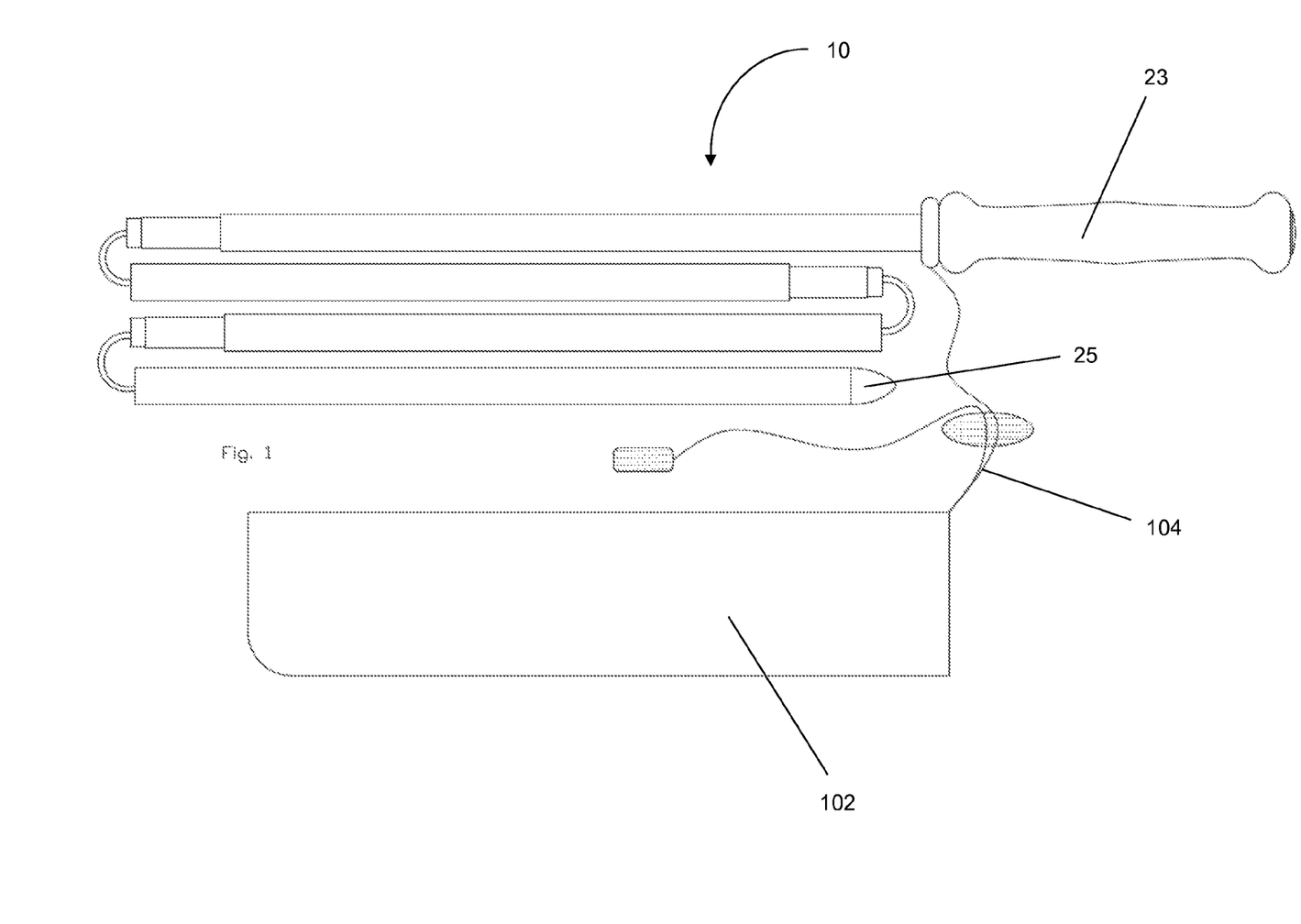
FIG. 1 shows a self-deploying staff incorporating the disclosed magnetically assisted couplings, the staff is depicted in a storage configuration, a holster and leash are also depicted.
Figure 5:
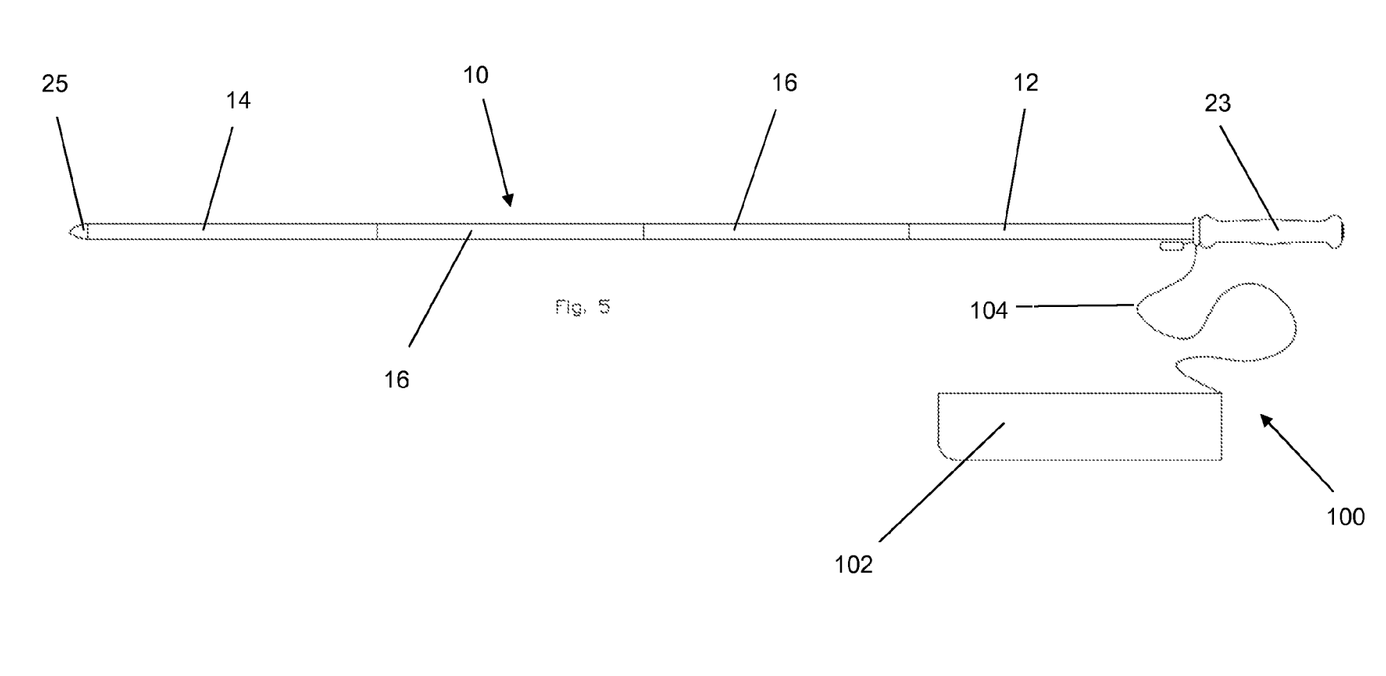
FIG. 5 shows the self-deploying staff of FIG. 1 in a deployed configuration.
Figure 6:
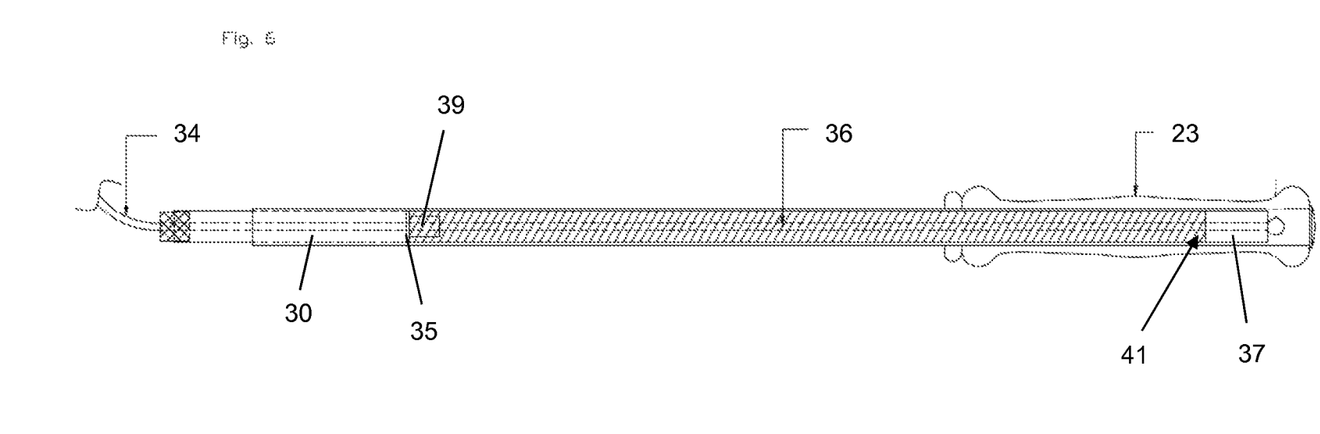
FIG. 6 shows a cross-sectional view of one embodiment of the self-deploying staff, with particular emphasis on the spring anchored at the first end of the top segment.

The self-deploying staff 10 is transformable between a storage configuration best seen in FIG. 1 and a deployed configuration shown in FIG. 5. Referring specifically to FIG. 6, the self-deploying wading staff 10 generally comprises a top segment 12, a bottom segment 14, and a plurality of intermediate segments 16. Each of the segments 12, 14, and 16 comprises a shaft segment 18 defining a hollow core 20. Though the shaft 18 in the Figures is depicted as having a generally circular cross-section, other cross-sectional shapes may be utilized for the shaft 18 without departing from the scope of the present disclosure. In one embodiment, the shaft segments are constructed from 7075 air craft grade aluminum tubing.

Figure 2:
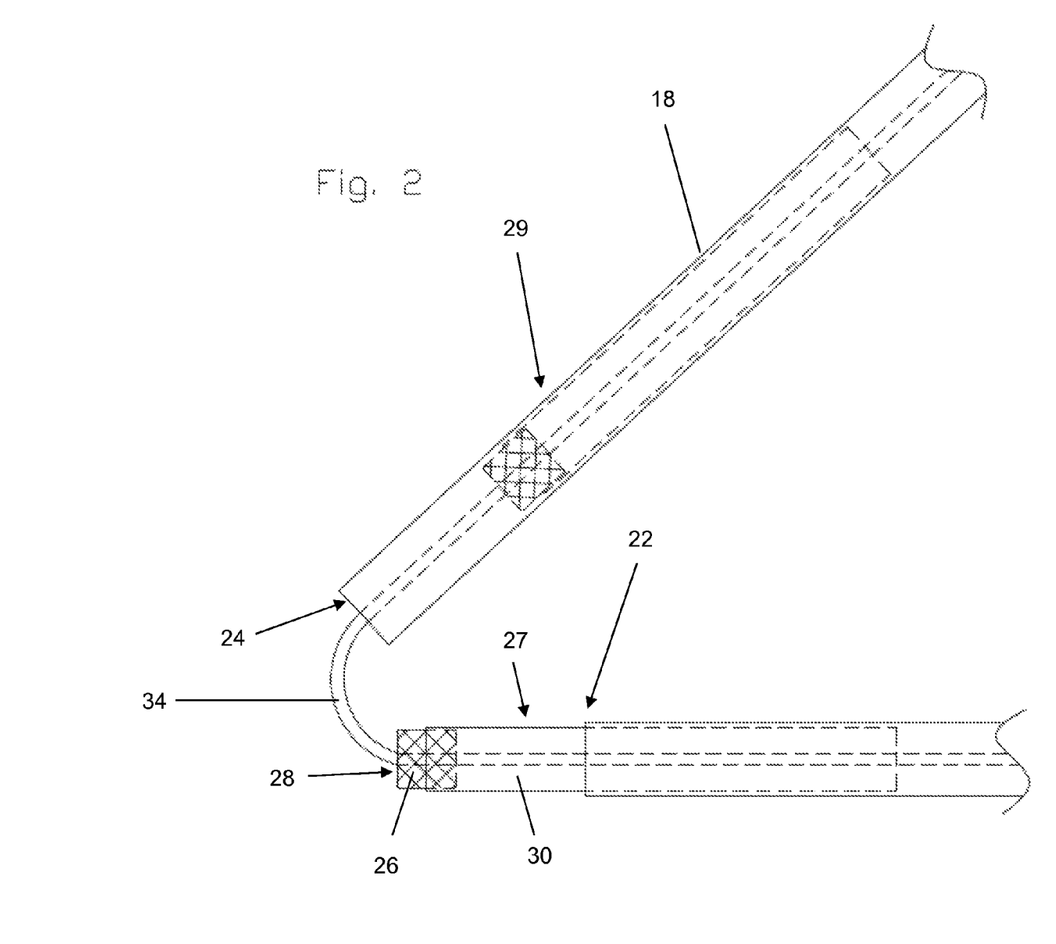
FIG. 2 is an enlarged cross sectional view of one embodiment of a magnetically assisted coupling, showing first and second connector ends of adjacent segments of a self-deploying staff, with particular emphasis on the ferrule and magnet of the first connector end of one segment and the collar of the second connector end of the adjacent segment.
Figure 3:
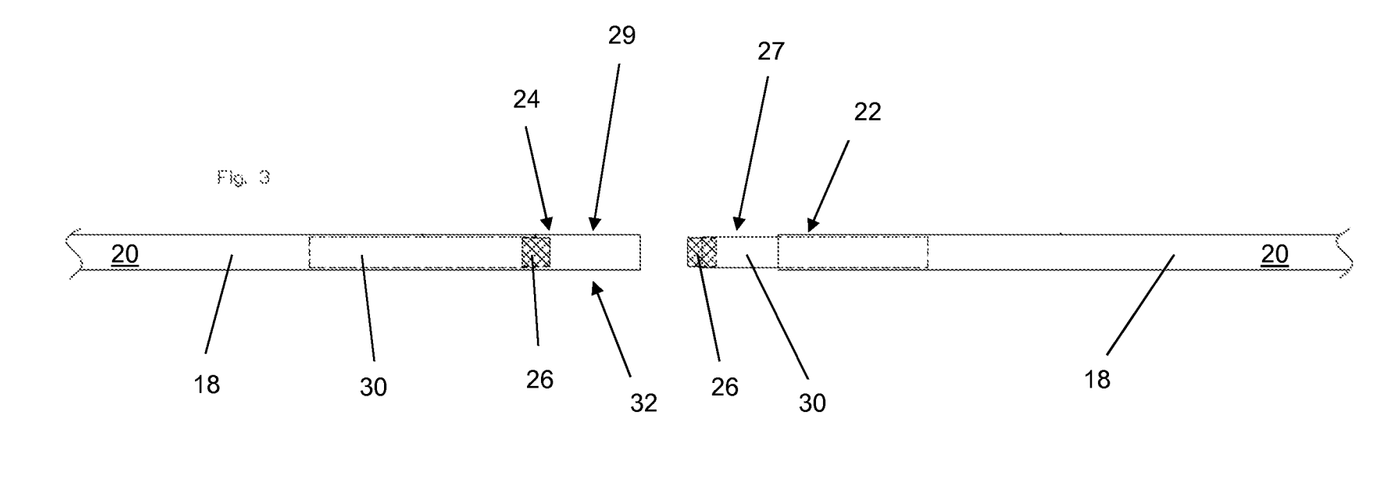
FIG. 3 is a cross-sectional view of the mateable ends of adjacent segments of the shaft of FIG. 2, the segments depicted in an uncoupled relationship and the static cord is not shown.
Figure 4:
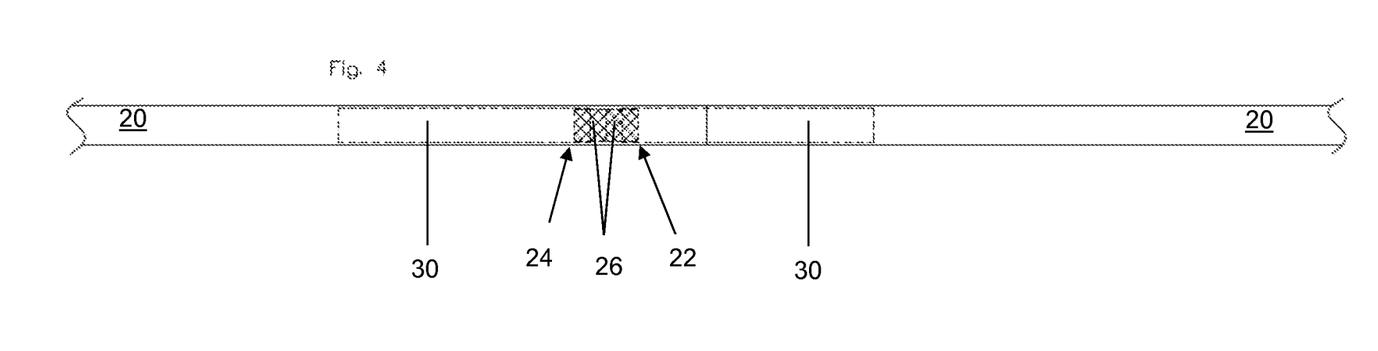
FIG. 4 is a cross-sectional view of the mateable ends of adjacent segments of the staff shown in FIG. 3, the segments depicted in a mated configuration and the static cord is not shown.

Referring to FIGS. 2, 3 and 4, each shaft segment 18 has at least one of a probe (male) or socket (female) mateable connector end 22, 24, respectively. Middle or intermediate shaft segments will have two mateable connector ends, each connector end being compatible with the connector end of an adjacent segment. In the disclosed staff 10, each of the first and second connector ends 22, 24 includes a magnet 26 which defines an aperture 28. As best seen in FIG. 2, the magnets 26 are cylindrical, with the middle of the magnet 26 defining an aperture 28. The disclosed magnets are of the same material and have the same length, outside diameter and inside diameter, but this is not necessary and other configurations are possible. Magnets 26 located in adjacent mateable ends 22, 24 are selected and arranged to have opposite polarity. Attraction between opposite polarity magnets in adjacent first and second connector ends 22, 24 assists in conversion of the staff from the stored configuration shown in FIG. 1 to a deployed configuration shown in FIG. 5. In one embodiment, the magnets 26 are rare earth magnets, preferably AlNiCo magnets, but other magnets may be compatible with the disclosed magnetically assisted couplings as will occur to those skilled in the art.

As best seen in FIGS. 1 and 5, a grip 23 is secured at the first end 22 of the top segment 12, while a tip 25 is secured at the second end 24 of the bottom segment 14. The grip 23 is constructed from a pliant yet buoyant material, such as closed cell foam or cork, while the tip 25 may be constructed from a carbide alloy (for durability) or soft material such as Delrin plastic (to reduce noise during use).

As best shown in FIGS. 2, 3 and 4, the magnets 26 of the disclosed shaft 10 are each received in a tubular ferrule 30. The first and second connector ends 22 and 24 of adjacent shafts 18 define male and female portions of a mateable shaft coupling 27 and 29, respectively. Since the magnets 26 are of the same outside diameter, the ferrules 30 may be constructed of substantially identical tubing. The shaft segments 18 are also constructed of aluminium tubing having the same dimensions. Using the same magnets 26 and tubular components reduces inventory, part count and tooling costs associated with manufacture of the disclosed staff 10. The magnets 26 are secured in the ferrules 30 so that the correct polarity end (North or South) of each magnet 26 protrudes from the respective ferrule 30. Magnets 26 may be secured to the ferrules 30 by swaging the ferrule around the magnet or by any form of adhesive. Other methods of joining these materials may also be compatible with the disclosed magnetically assisted couplings as will occur to those skilled in the art.

As shown in FIG. 3, the ferrule 30 is secured to one end 22 of a shaft segment 18 so that the ferrule 30 and magnet 26 project from the end of the shaft segment 18 to form the male part 27 of the mateable coupling. In the adjacent end 24 of the neighboring shaft segment 18, the ferrule 30 is secured in a recessed position inside the shaft segment to form the female part 29 of the mateable coupling. The portion of the shaft segment 18 extending beyond the recessed position of the ferrule 30 and magnet 26 defines a collar 32. The collar 32 is sized to receive the ferrule projecting from the first end 22 such that the ferrule of the male portion of the connector is secure within the hollow core, but may still be withdrawn without excessive force. The disclosed magnet/ferrule/shaft configuration employs straight tubing, which is easy to work with. Seating the magnets first in a ferrule allows the ferrule to be secured at alternative positions within the shaft segments to define male and female parts of the mateable coupling without the need to alter the segmented configuration of the tubular shaft segments 18 or ferrules 30.

In the disclosed magnetically assisted couplings, the ferrule 30 of the coupling part 27 extends between adjacent shaft segments 18, reinforcing the deployed shaft against side loads. As shown in FIGS. 3 and 4, greater than half of the length of the ferrule 30 is received in hollow core 20 of the male portion 27, while less than half the length of the ferrule 30 projecting from the male portion 27 is received in the hollow core 20 of the female portion 29. The magnets 26 provide a strong connective force between adjacent segments 12, 14 and 16, and require that a minimal amount of the male portion 27 project into the female portion 29.

The male and female coupling parts 27, 29 may be reversed, and a shaft can be constructed where an intermediate segment 16 may include two male coupler parts 27 or two female coupler parts 29, so long as the adjacent ends of shaft segments include complimentary coupler parts.

A static cord 34, is anchored at both extreme ends of the staff 10. The cord 34 extends from the first end 22 of the top segment 12 (adjacent the grip) and the second end 24 of the bottom segment 14. In the embodiment shown in FIG. 6, the cord 34 is formed from a static, non-stretchable material and held under tension by a coil spring 36 at the first end 22 of the top segment 12. Other materials will occur to those skilled in the art and may include a fine metal cable or the like. In the embodiment depicted in FIG. 6, the spring is a compression spring 36. First and second generally cylindrical stoppers 35 and 37, respectively, act as seats for the compression spring 36. The compression spring 36 and cord 34 cooperate to keep the cord 34 under tension at all times.

The first and second generally cylindrical stoppers 35 and 37 are housed within the core 20 of the shaft 18. The first generally cylindrical stopper 35 may comprise a washer, a cylindrical insert, or any structure which abuts the ferrule 30, which acts as a fixed stop and prevents a spring first end 39 from projecting from the second end 24 of the top section 12. The second generally cylindrical stopper 37 acts as an anchor point for the cord 34, and abuts the second end 41 of the spring 36. When the staff is in the storage configuration, the cord 34 and second stopper 37 compress the spring 36 against the fixed first stopper 35 and ferrule 30. The disclosed configuration maintains tension on the cord 34, which assists in one handed deployment and self-assembly of the wading staff. Other arrangements for maintaining tension on the cord 34 may occur to those skilled in the art and are intended to be encompassed by the appended claims.

The cord 34 and coil spring 36 facilitate one handed transformation of the staff 10 from the storage configuration to the deployed configuration by preserving alignment between adjacent shaft segments 18 and urging the segments together. When the magnets 26 embedded in the coupling portions 27, 29 come within close proximity to each other, the magnetic attraction completes the coupling and resists pulling forces that would otherwise separate the shaft segments 18 from each other.

FIGS. 1 and 5 show one embodiment of the present disclosure, where the wading staff 10 is included as part of a wading staff kit 100. A holster 102 is configured to receive the wading staff 10 when in the storage configuration. The holster 102 may be constructed from any material that may get wet and dry out without significant warping or damage to the holster 102. Appropriate materials include nylon fabric, leather, cotton, and expanded PTFE fabric.

In the embodiment of the kit depicted in FIGS. 1 and 5, a leash 104 connects the top segment 12 of the wading staff 10 with the holster 102. The length of the leash 103 may be adjustable, while the holster 102 may have a loop of material (not shown), a resilient clip (not shown), or other structure for securing the holster 102 to an angler's waders, or vest.

The staff 10 of the present disclosure is self-deploying, insomuch that an angler need not physically manipulate each individual segment to transform the staff 10 between the storage and deployed configurations. An angler need only grasp the top segment 12, and ensure that the bottom and intermediate segments 14 and 16 are free to fall under the influence of gravity.

As the bottom and intermediate segments 14 and 16 fall, the cord 34 ensures that the first and second connector ends 22 and 24 of each adjacent segment are maintained in close proximity to one another. In the embodiment where the cord 34 is formed from a static material and anchored via a coil spring, the cord urges the first and second ends 22 and 24 of adjacent shaft segments toward one another.

The magnetic field from each of the plurality of magnets 26 attracts and couples the first and second connector ends 22 and 24 of each adjacent segment. In the embodiment having male and female connector portions 27 and 29, the magnets 26 urge the male portion 27 into the collar 32 of the female portion 29. The magnets 26 are sufficiently strong to ensure that the ferrule 30 of the male portion 27 is secured within the female portion 29. Once configured in the deployed configuration, the magnets 26 and cord 34 prevent the segments 12, 14 and 16 from uncoupling should the tip 25 get caught in mud, clay, or cracks between rocks.

To transform the staff 10 from the deployed configuration to the storage configuration, an angler must uncouple each individual segment 12, 14 or 16 from its neighbor. The segmented configuration of the staff 10 permits an angler to decouple as many or as few of the segments 12, 14 or 16 as is appropriate. The segments 12, 14 and 16 are folded back on one another, as each is successively decoupled from its neighbor, creating an increasingly larger diameter and shorter length bundle. To prevent the staff 10 from self-deploying in undesirable situations, the staff may be secured in the holster 102, or the segments 12, 14 and 16 may be secured with a strap, a length of string, or other suitable material.

Though the magnetically assisted coupling for a segmented shaft of the current disclosure has been described in connection with an angler's wading staff, the coupling may be used in a number of other applications. For example, the magnetically assisted coupling may be used in hiking poles, tent poles, avalanche probes, and any of a multitude of other devices having segmented shafts that must be converted between and extended and compact configuration.

While a preferred embodiment has been set forth for purposes of illustration, the foregoing description should not be deemed a limitation of the invention herein. Accordingly, various modifications, adaptations and alternatives may occur to one skilled in the art without departing from the spirit of the invention and scope of the claimed coverage.

What is claimed is:

1. A magnetically assisted coupling for a shaft comprising:
at least two shaft segments, each shaft segment having opposed ends and a hollow core, wherein adjacent segment ends are configured in a probe/socket configuration such that one segment end is configured as a socket to receive said adjacent segment end configured as a probe;
magnets of opposite polarity mounted within said hollow core of adjacent segment ends, such that said magnet in each socket is positioned at a bottom of said socket, while said magnet in each probe defines a probe end;

a pair of shaft segment free ends at axially opposed ends of said shaft and not configured as a probe or socket, and a tension device secured at said free ends and extending through said coupling;

wherein when adjacent segment ends are brought into close proximity said magnets attract each other and draw said probe end into said socket until said magnets are in contact.

2. The magnetically assisted coupling of claim 1, wherein said magnets are rare-earth magnets.

3. The magnetically assisted coupling of claim 2, wherein said magnets are AlNiCo magnets.

4. The magnetically assisted coupling of claim 1, wherein said magnets of said probe and said socket ends are secured in a ferrule.

5. The magnetically assisted coupling of claim 1, wherein said probe end spans a void between said bottom of said socket and said segment end.

6. The magnetically assisted coupling of claim 1, wherein said tension device is a static cord secured via a spring to at least one of said free ends of said shaft.

7. A self-deploying staff comprising:

a top segment, a bottom segment, and at least one intermediate segment, each segment comprising a shaft having a hollow core and first and second connector ends, said first end of said bottom segment, said second end of said top segment, and said first and second ends of said intermediate segment each having magnets defining apertures;

a cord anchored at said first connector end of said top segment and said second connector end of said bottom segment threaded through said hollow core of each segment and received in each of said apertures intermediate said top segment first connector end and said bottom segment second connector end;

wherein said staff is transformable between a storage configuration where each of said segments is uncoupled and secured in a compact bundle, and a deployed configuration where said first and second connector ends of each segment are mated to form an unitary staff.

8. The staff of claim 7, wherein said cord is a static cord, and at least one of said second connector end of said bottom segment or said first connector end of said top segment has a spring configured to create tension on said cord such that said cord urges said staff into said deployed configuration.

9. The staff of claim 7, wherein each of said magnets is received in a ferrule.

10. The staff of claim 9, wherein said magnets, ferrules, and cores of each adjacent segment form male and female portions of a connector system configured such that said male portion projects from one of said first or said second ends, while said magnets and ferrules are recessed within the other of said first or said second ends forming said female portion, and wherein said first end of said top segment has a grip and said second end of said bottom segment has a tip.

11. The staff of claim 7, wherein the magnets are rare earth magnets.

12. The staff of claim 11, wherein the magnets are AlNiCo magnets.

13. A wading staff kit comprising:

a self-deploying staff comprising a top segment, a bottom segment, and a plurality of intermediate segments, each segment comprising a shaft having a hollow core and first and second connector ends having mateable magnets defining apertures extending axially through each said magnet; a cord anchored at said first end of said top segment and said second end of said bottom segment threaded through said hollow core of each segment and each of said apertures intermediate said top segment first end and said bottom segment second end; wherein said staff is transformable between a storage configuration wherein each of said segments are uncoupled and secured in a compact bundle, and a deployed configuration where said first and second connector ends of each subsequent segment are mated to form an unitary staff;

a holster sized to receive said staff in said storage configuration; and an adjustable leash connecting said staff to said holster.

14. The kit of claim 13, wherein said cord is a static cord, and said first end of said top segment has a spring configured to create tension on said cord such that said cord urges said staff into said deployed configuration when said staff is removed from said holster.

15. The kit of claim 13, wherein said cord is a static cord, and said second end of said bottom segment has a spring configured to create tension on said cord such that said cord urges said staff into said deployed configuration when said staff is removed from said holster.

16. The kit of claim 13, wherein each said magnet is supported in a ferrule and said ferrule for each of said magnets of said second ends project from each of said intermediate segments and said top segment, while said ferrule of said first ends of each of said intermediate segments and said bottom segment is recessed inside of said hollow core such that said first ends have a collar sized to receive said ferrule and said magnet of said first end, said first end of said top segment has a grip and said second end of said bottom segment has a tip.

17. The kit of claim 13, wherein each said magnet is supported in a ferrule and said ferrule for each of said magnets of said first ends project from each of said intermediate segments and said bottom segment, while said ferrule of said second ends of each of said intermediate segments and said top segment is recessed inside of said hollow core such that said second ends have a collar sized to receive said ferrule and said magnet of said first end, and wherein said first end of said top segment has a grip and said second end of said bottom segment has a tip.

18. The kit of claim 13, wherein the magnets are rare earth magnets.

19. The kit of claim 18, wherein the magnets are AlNiCo magnets.

* * * * *